(12) United States Patent
Ohtomo et al.

(10) Patent No.: US 7,177,015 B2
(45) Date of Patent: Feb. 13, 2007

(54) DISTANCE-MEASURING DEVICE

(75) Inventors: Fumio Ohtomo, Tokyo-to (JP); Kaoru Kumagai, Tokyo-to (JP); Jun-ichi Kodaira, Tokyo-to (JP)

(73) Assignee: Kabushiki Kaisha Topcon, Tokyo-to (JP)

( * ) Notice: Subject to any disclaimer, the term of this patent is extended or adjusted under 35 U.S.C. 154(b) by 420 days.

(21) Appl. No.: 10/732,075

(22) Filed: Dec. 10, 2003

(65) Prior Publication Data

US 2004/0125357 A1   Jul. 1, 2004

(30) Foreign Application Priority Data

Dec. 26, 2002   (JP)   ............................. 2002-378459

(51) Int. Cl.
*G01C 3/08*   (2006.01)
(52) U.S. Cl. ................... 356/5.13; 356/4.01; 356/5.01
(58) Field of Classification Search ............... 356/4.01, 356/4.07, 5.01, 5.15, 5.11–5.13
See application file for complete search history.

(56) References Cited

U.S. PATENT DOCUMENTS

| | | | |
|---|---|---|---|
| 5,892,617 A * | 4/1999 | Wallace | 359/353 |
| 6,411,371 B1 | 6/2002 | Hinderling et al. | 356/4.01 |
| 6,542,225 B2 * | 4/2003 | Ueno et al. | 356/5.1 |
| 2002/0080368 A1 * | 6/2002 | Ohishi et al. | 356/614 |
| 2003/0133092 A1 * | 7/2003 | Rogers | 356/4.01 |

FOREIGN PATENT DOCUMENTS

| | | | |
|---|---|---|---|
| DE | 2445966 A * | 4/1976 | |
| EP | 0 640 846 | 3/1995 | |
| EP | 1 004 917 | 5/2000 | |
| JP | 09-005426 | 1/1997 | |
| JP | 2000-088566 | 3/2000 | |
| JP | 2000-162517 | 6/2000 | |
| JP | 2001-117019 | 4/2001 | |
| JP | 2002-196076 | 7/2002 | |

\* cited by examiner

*Primary Examiner*—Thomas H. Tarcza
*Assistant Examiner*—Isam Alsomiri
(74) *Attorney, Agent, or Firm*—Nields & Lemack (57) ABSTRACT

A distance-measuring device, comprising a light source unit for emitting a distance-measuring light, a photodetection optical system, a projecting optical system for projecting the distance-measuring light from the light source unit to an object to be measured and for guiding the distance-measuring light reflected by the object to be measured to the photodetection optical system, and an internal reference optical system for guiding the distance-measuring light from the light source unit toward the photodetection optical system, wherein the light source unit can emit two distance-measuring lights having different spreading angles and having the same or almost the same wavelengths, and the photodetection optical system has an optical filter which transmits light components of narrower wavelength range of the distance-measuring light.

7 Claims, 5 Drawing Sheets

DISTANCE-MEASURING DEVICE

BACKGROUND OF THE INVENTION

The present invention relates to a distance-measuring device for measuring a distance to an object by using a laser beam.

In recent years, a non-prism distance-measuring device has been widely propagated. This device projects a laser beam for distance measurement directly to an object to be measured and measures a distance to the object to be measured.

In the non-prism distance-measuring device, a laser beam with a smaller beam diameter is used. By the use of the laser beam with the smaller beam diameter, the laser beam can be pinpointed to the object to be measured. As a result, a measuring position of the object can be accurately identified, and a ridgeline or a specific point on the object can be measured.

The intensity of the projected laser beam is limited from the reasons such as safety. In this respect, in a non-prism distance-measuring device, in which it is not possible to have high reflection from the object to be measured, the measuring distance is shorter compared with a distance-measuring device using a prism (corner cube).

For this reason, a prism is used as the object to be measured in long-distance measurement. To facilitate collimation and to attain highly accurate measurement, a laser beam with relatively large beam spreading is used.

As described above, the beam diameter of the laser beam is smaller in the non-prism distance-measuring device, and it is difficult to project the laser beam to the prism. Thus, it is not adequate to use the prism for long-distance measurement.

However, it is not very economical to install both a distance-measuring device for long distance using a prism and a non-prism distance-measuring device. In this respect, a distance-measuring device is now proposed, by which the distance measurement using a prism and the non-prism distance measurement can be achieved by a single distance-measuring device.

For instance, as described in JP-A-2000-88566 (FIG. 1; Paragraphs [0029]–[0035]), a distance-measuring device has been proposed, by which distance measurement using prism and non-prism distance measurement can be performed by a single distance-measuring device.

Figure 7:
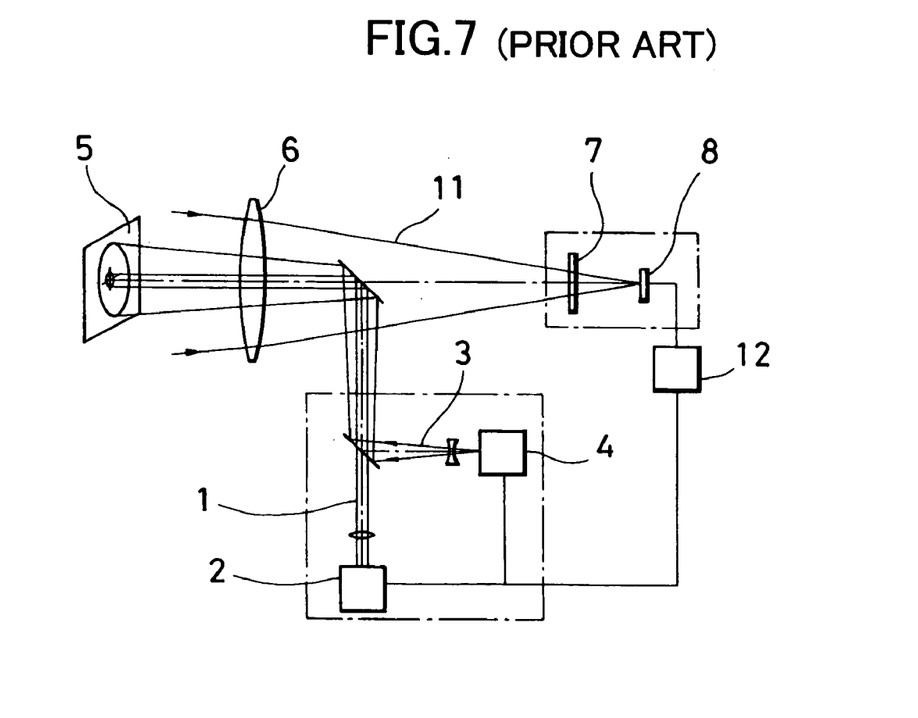
FIG. 7 is a block diagram to explain a conventional example.

Referring to FIG. 7, brief description is given.

There are provided a first light source 2 for emitting a visible laser beam 1 and a second light source 4 for emitting an infrared laser beam 3, and the visible laser beam 1 and the infrared laser beam 3 can be emitted separately. The visible laser beam 1 is a laser beam with a smaller beam diameter and having parallel luminous fluxes. The infrared laser beam 3 is a divergent laser beam.

The visible laser beam 1 and the infrared laser beam 3 are selected according to a type of an object to be measured. For instance, when the object to be measured 5 is a reflective object such as a corner cube, the divergent infrared laser beam 3 is projected. When the object to be measured 5 is a wall surface of a building, etc., for instance, the visible laser beam 1 with a smaller beam diameter is projected. A reflection light 11 from the object to be measured 5 is received by a detector 8 through an objective lens 6 and a filter 7. Based on a signal from the detector 8, a distance to the object to be measured 5 can be calculated by an arithmetic unit 12.

The filter 7 transmits only light components in wavelength range of the visible laser beam 1 and the infrared laser beam 3. Unnecessary light components such as solar light are cut off. This contributes to the improvement of detection accuracy to detect the reflection light 11 of the detector 8.

Figure 8:
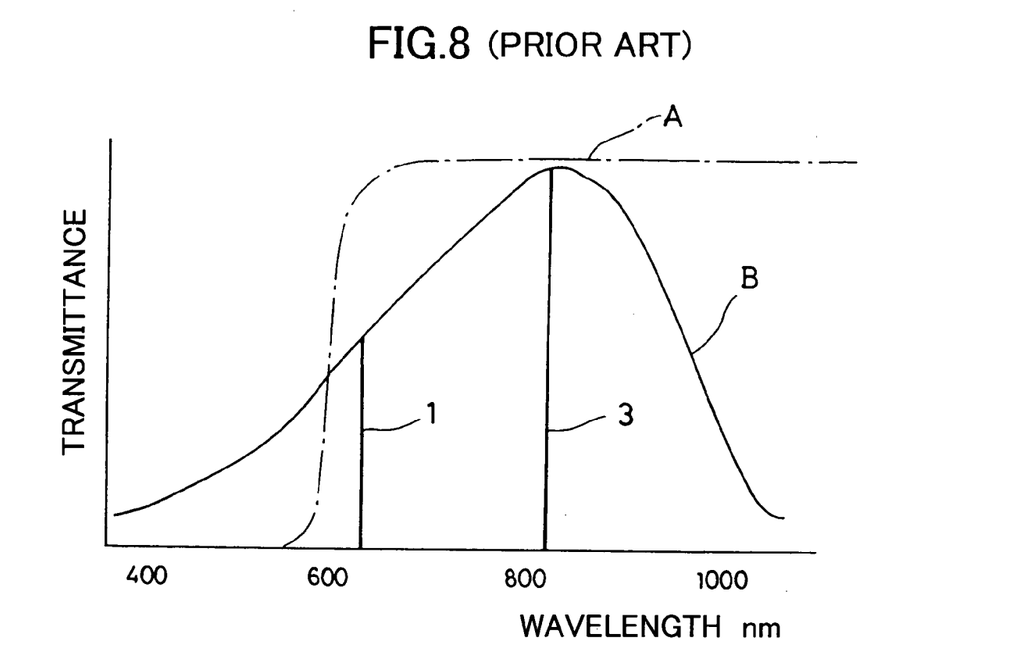
FIG. 8 is a diagram showing transmission characteristics of a filter used in the conventional example.

In the conventional type distance-measuring device as described above, two light sources are used, and this means that the complicated design is required for the light emitting unit in the features such as control of the light sources. Because the visible laser beam 1 and the infrared laser beam 3 are used, the filter 7 is designed to fit the wavelength ranges of both of the laser beams. FIG. 8 shows the relation between wavelength transmission characteristics A of the filter 7 and photodetection characteristics B of the detector 8 and also the relation between wavelengths of the visible laser beam 1 and the infrared laser beam 3.

Figure 9:
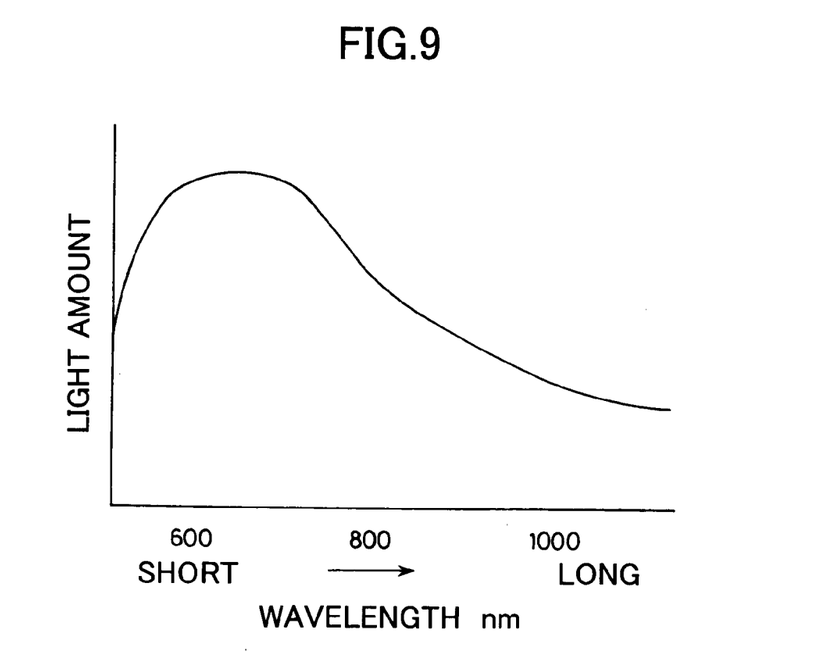
FIG. 9 is a diagram showing distribution characteristics of a wavelength of solar light.

The filter 7 transmits the light components with wavelengths of the visible laser beam 1 and the infrared laser beam 3, and the filter 7 has such characteristics as to transmit light components having a wavelength longer than a transmission wavelength of the visible laser beam 1. Therefore, when a light beam of a wavelength range wider than that of the visible laser beam 1 and the infrared laser beam 3 enter and the detector 8 receives the reflection light 11, an S/N ratio of the reflection light 11 with respect to disturbance light is smaller. An avalanche photodiode (APD) which is generally used as the detector 8 has such photodetection characteristics that sensitivity is at the highest in the wavelength range of about 780 nm. In particular, when measurement is performed with the visible laser beam 1 as in the conventional type device, the reflection light 11 is detected when the sensitivity of the detector 8 is low. In most cases, disturbance light is solar light. Wavelength distribution of solar light is as shown in FIG. 9, and the wavelength distribution is widely spread over the range beyond the visible range. Therefore, when the filter 7 as described above is used, which has such characteristics as to transmit the light components with a wavelength longer than the wavelength of the visible laser beam 1, there is a problem in that the S/N ratio is still lower.

SUMMARY OF THE INVENTION

It is an object of the present invention to provide a distance-measuring device, by which it is possible to perform distance measurement by using a prism and non-prism distance measurement in a single light source, to improve an S/N ratio of detected reflection light, and to achieve higher accuracy in distance measurement.

To attain the above object, the present invention provides a distance-measuring device, which comprises a light source unit for emitting a distance-measuring light, a photodetection optical system, a projecting optical system for projecting the distance-measuring light from the light source unit to an object to be measured and for guiding the distance-measuring light reflected by the object to be measured to the photodetection optical system, and an internal reference optical system for guiding the distance-measuring light from the light source unit toward the photodetection optical system, wherein the light source unit can emit two distance-measuring lights having different spreading angles and having the same or almost the same wavelengths, and the photodetection optical system has an optical filter which transmits light components of narrower wavelength range of the distance-measuring light. Also, the present invention provides the distance-measuring device as described above, wherein the light source unit has two light sources for emitting distance-measuring lights having the same or almost the same wavelengths, the distance-measuring light emitted from one of the light sources is projected with a smaller spreading angle via a first optical path, and a distance-measuring light emitted from the other of the light sources is projected with a larger spreading angle via a second optical path. Further, the present invention provides the distance-measuring device as described above, wherein the distance-measuring light is infrared light. Also, the present invention provides the distance-measuring device as described above, wherein the optical filter is arranged on an optical path common to the internal reference light and to the reflected distance-measuring light. Further, the present invention provides the distance-measuring device as described above, wherein the photodetection optical system comprises an optical member for turning luminous fluxes entering the optical filter to parallel beams. Also, the present invention provides the distance-measuring device as described above, wherein the light source unit comprises a light source, a first optical path, a second optical path, and an optical path switching means for guiding the distance-measuring light from the light source to the first optical path or the second optical path, wherein a distance-measuring light with a smaller spreading angle is projected from the first optical path, and a distance-measuring light with a larger spreading angle is projected from the second optical path. Further, the present invention provides the distance-measuring device as described above, wherein the optical path switching means is provided so as to be spanned between the first optical path and the second optical path and is a deflecting optical member for deflecting the optical path, and the deflecting optical member can be placed on or separated from the first optical path and the second optical path. Also, the present invention provides the distance-measuring device as described above, wherein the optical path switching means comprises a beam splitter having the first optical path as a transmission optical path and the second optical path as a reflection optical path, and an optical path interrupting member for selectively interrupting the first optical path and the second optical path. Further, the present invention provides the distance-measuring device as described above, wherein the distance-measuring light of the second optical path is projected through an optical fiber. Also, the present invention provides the distance-measuring device as described above, wherein the light source unit comprises a light mixing means, and at least the distance-measuring light with a larger spreading angle is projected via the light mixing means. Further, the present invention provides the distance-measuring device as described above, wherein there is provided a pointer light source for emitting a visible laser beam along a projection optical axis.

BRIEF DESCRIPTION OF THE DRAWINGS

FIG. 4(A) is a plan view, FIG. 4(B) is a front view, and FIG. 4(C) is a side view.

DETAILED DESCRIPTION OF THE PREFERRED EMBODIMENTS

Description will be given below on embodiments of the present invention referring to the drawings.

Figure 1:
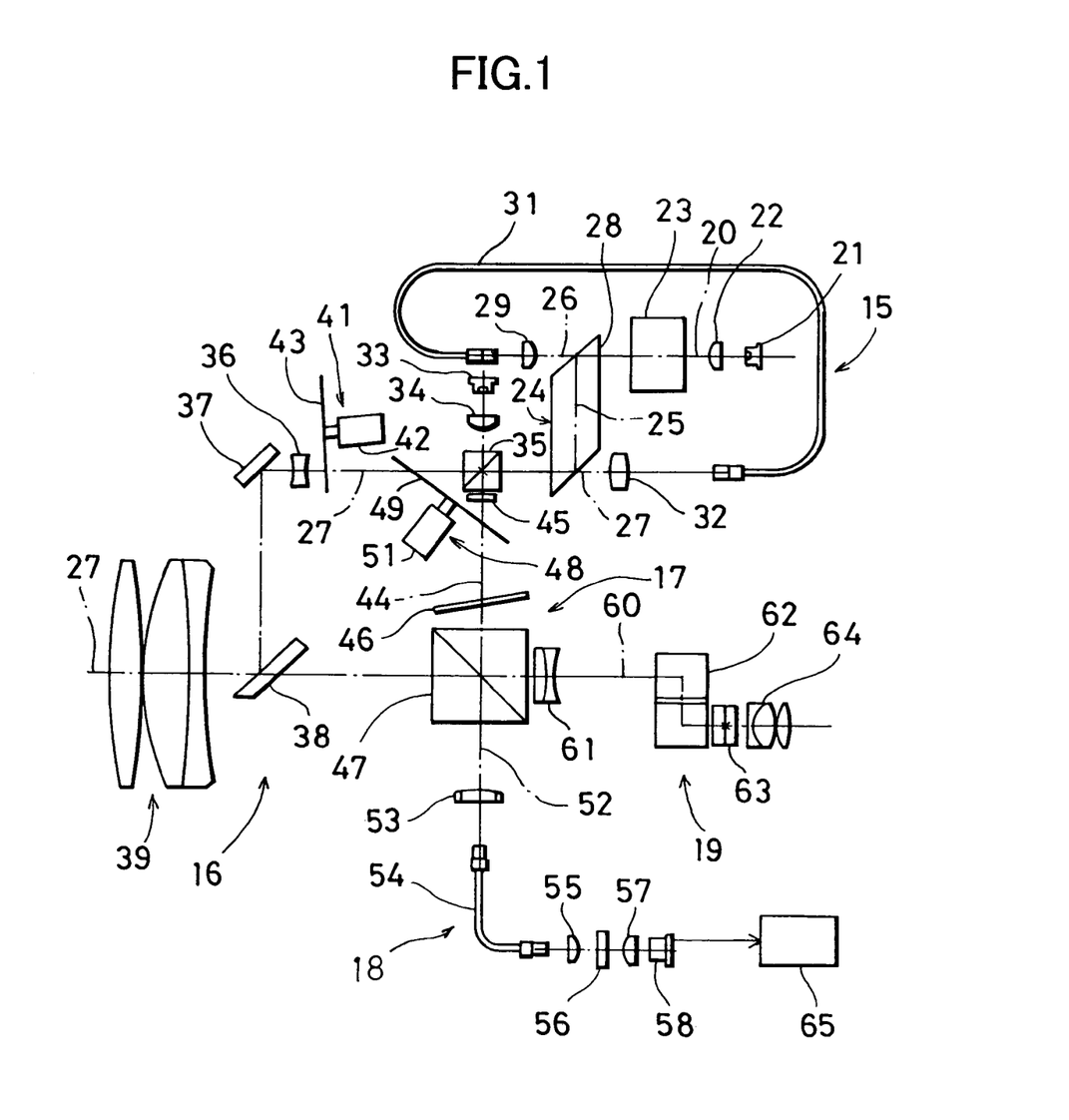
FIG. 1 is a schematical block diagram showing a first embodiment of the present invention.

FIG. 1 is a schematical block diagram of a first embodiment of the present invention. In the figure, reference numeral 15 denotes a light source unit, 16 a projecting optical system, 17 an internal reference optical system, 18 a photodetection optical system, and 19 an ocular optical system (telescope).

First, the light source unit 15 is described.

A laser light source 21 emits a distance-measuring light of infrared light of 780 nm, for instance. On an optical axis 20 of the laser light source 21, there are provided a first collimator lens 22, a mixing means 23, and an optical path switching means 24.

As the mixing means 23, for instance, the one proposed in JP-A-2002-196076 is used.

The mixing means 23 as disclosed in JP-A-2002-196076 comprises a pair of gradient index lenses provided on the optical axis and a phase plate arranged between the gradient index lenses so as to interrupt the optical path, and the phase plate is rotated. On the phase plate, surface irregularities, i.e. convex and concave portions on the surface are formed in checkered pattern. The surface irregularities cause phase difference of π/2 of a wavelength of the laser beam.

The optical path switching means 24 can make selection between a first optical path 25 and a second optical path 26. The first optical path 25 and the second optical path 26 are aligned with a projection optical axis 27 by the optical path switching means 24.

The optical path switching means 24 comprises, for instance, a rhombic prism 28 rotatably supported. By rotating the rhombic prism 28, the first optical path 25 or the second optical path 26 is selected. When the first optical path 25 is selected, the distance-measuring light from the laser light source 21 enters the rhombic prism 28 through the mixing means 23. The distance-measuring light is then reflected twice by the rhombic prism 28 and is aligned with the projection optical axis 27 in parallel to the optical axis 20.

The second optical path 26 concurs with an extension of the optical axis 20. Along the second optical path 26, there are provided a second collimator lens 29 and an optical fiber 31, and a third collimator lens 32 is arranged on an exit end of the optical fiber 31. The optical axis of the third collimator lens 32 concurs with the projection optical axis 27.

Under the condition where the optical path switching means 24 selects the second optical path 26, the rhombic prism 28 is deviated from the optical axis 20. The distance-measuring light from the mixing means 23 is converged by the second collimator lens 29. Then, the light enters the optical fiber 31 via an incident end of the optical fiber 31. The distance-measuring light projected from the optical fiber 31 is turned to parallel luminous fluxes by the third collimator lens 32 and the distance-measuring light is projected along the projection optical axis 27.

The light source unit 15 has a pointer light source 33. An LD is used as the pointer light source 33. It emits a pointer laser beam of visible light. The pointer laser beam is turned to parallel luminous fluxes by a fourth collimator lens 34 and is projected to an object to be measured (not shown) via the projecting optical system 16.

Now, description will be given on the projecting optical system 16.

On the projection optical axis 27, there are provided a beam splitter 35, a concave lens 36, a first optical path deflecting member 37, a second optical path deflecting member 38, and an objective lens 39. A projection light amount adjusting means 41 is arranged between the beam splitter 35 and the concave lens 36.

The projection light amount adjusting means 41 is rotated by a light amount adjusting motor 42 having a positioning function such as a stepping motor. The projection light amount adjusting means comprises a light amount adjusting plate 43 where a transmission light amount is changed continuously or gradually in a perimeter direction. The light amount adjusting plate 43 is arranged to interrupt the projection optical axis 27.

The concave lens 36 is arranged in such manner that a focusing position of the concave lens 36 concurs with a focusing position of the objective lens 39. The concave lens 36 and the objective lens 39 make up together a beam expander so that parallel luminous fluxes guided to the concave lens 36 are expanded and projected. In this respect, the influence from the optical elements such as the beam splitter 35, the light amount adjusting plate 43, etc. can be minimized. Also, compared with a structure where the laser light source 21 is arranged at the focusing position of the objective lens 39, projection efficiency is improved.

The beam splitter 35 transmits most of the distance-measuring light (infrared light) from the laser light source 21, while it reflects a part of the distance-measuring light. The beam splitter 35 totally reflects the pointer laser beam (visible light) from the pointer light source 33. The first optical path deflecting member 37 is designed as a mirror, and the second optical path deflecting member 38 is designed as a half-mirror.

Now, description will be given on the internal reference optical system 17.

The internal reference optical system 17 is provided between the light source unit 15 and the photodetection optical system 18. The internal reference optical system 17 has an internal reference optical axis 44 which is aligned with a transmission optical axis of the beam splitter 35. A condenser lens 45, a density filter 46, and a dichroic prism 47 are arranged on the internal reference optical axis 44.

Chopper means 48 is provided so as to be spanned between the projection optical axis 27 and the internal reference optical axis 44. The chopper means 48 comprises a chopper plate 49 for interrupting the projection optical axis 27 and the internal reference optical axis 44 and a chopper motor 51 for rotating the chopper plate 49 and for determining its position. Under the condition where the chopper plate 49 interrupts the projection optical axis 27, the internal reference optical axis 44 is in a state to allow the light to pass. Under the condition where the chopper plate 49 interrupts the internal reference optical axis 44, the projection optical axis 27 is in a state to allow the light to pass.

By rotating the chopper plate 49, it can be alternatively selected whether the distance-measuring light from the light source unit 15 is projected to the projection optical axis 27 or the distance-measuring light is projected to the internal reference optical axis 44 as an internal reference light.

The density filter 46 is used to adjust light intensity of the internal reference light so that the light intensity of the reflected distance-measuring light from the object to be measured is approximately equal to the light intensity of the internal reference light.

Now, description will be given on the photodetection optical system 18.

Figure 2:
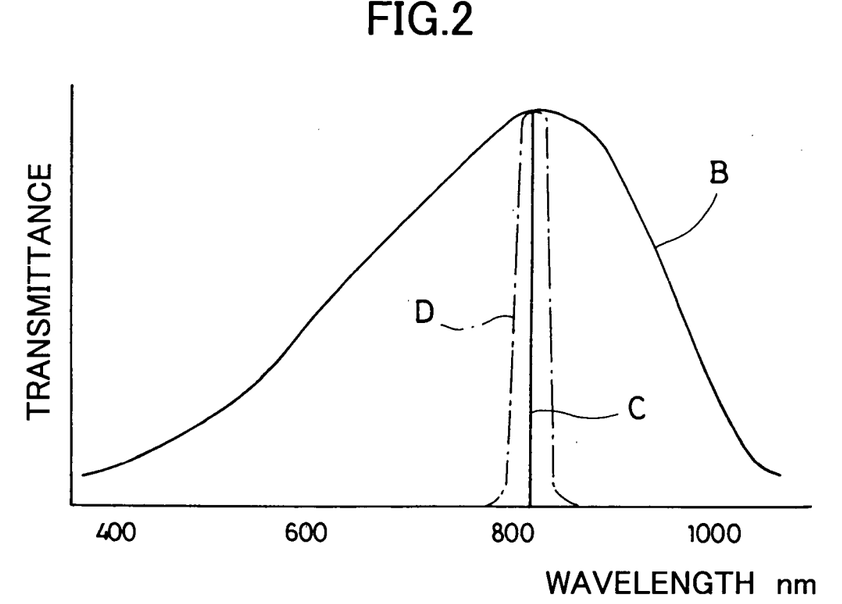
FIG. 2 is a diagram showing transmission characteristics of an interference filter used in the first embodiment.

The photodetection optical system 18 comprises a photodetection optical axis 52, which is aligned with an extension of the internal reference optical axis 44. On the photodetection optical axis 52, there are provided the dichroic prism 47, a doughnut lens 53, a photodetection fiber 54, a fifth collimator lens 55, an interference filter 56, a condenser lens 57, and a photodetection element 58. An avalanche photodiode (APD) is used, for instance, as the photodetection element 58. The interference filter 56 has such characteristics as to transmit a light in a wavelength range near 800 nm as shown in FIG. 2, for instance. When the photodetection element 58 receives the reflected distance-measuring light, a photodetection signal is sent to an arithmetic unit 65, where a distance to the object to be measured is calculated based on the photodetection signal.

Now, the ocular optical system 19 is described.

The ocular optical system 19 has an ocular optical axis 60, and the ocular optical axis 60 concurs with an extension of an optical axis of the objective lens 39 which passes through the dichroic prism 47. On the ocular optical axis 60, there are provided a focusing lens 61 movable along the ocular optical axis 60, an erecting prism 62 for converting an image to an erected image, a collimating plate 63 having a collimation line such as a cross-line, and an ocular lens 64.

Description will be given below on operation.

First, the pointer light source 33 is turned on, and a pointer laser beam is emitted. The pointer laser beam is reflected by the beam splitter 35 and is projected to the object to be measured by the objective lens 39 through the first optical path deflecting member 37 and the second optical path deflecting member 38. Because the pointer laser beam is projected along the same axis as the projection optical axis 27, the pointer laser beam is accurately projected to a measuring point. A projecting point of the pointer laser beam is observed by the ocular optical system 19, and the measuring point is determined. When the measuring point is determined, the pointer light source 33 is turned off.

The pointer light source 33 is turned on only when necessary, and this extensively reduces the risk of projection of a laser beam to eyes of workers or passers-by at a working place. This prevents the workers or the passers-by from having uncomfortable feeling or dazzling.

In case non-prism distance measurement is performed to measure an object such as a wall surface of a building, non-prism measurement is selected.

When the non-prism measurement is selected, the rhombic prism 28 is positioned so as to interrupt the second optical path 26 and the projection optical axis 27. The distance-measuring light emitted from the laser light source 21 is mixed by the mixing means 23. When being mixed, light amount speckles are eliminated, and this leads to the improvement of measurement accuracy. The optical path is deflected to the first optical path 25 by the rhombic prism 28, and the light passes through the beam splitter 35 and is projected to the object to be measured by the projecting optical system 16.

A beam diameter and a spreading angle of the projected distance-measuring light depend upon size of the emitting light source. In case of a semiconductor laser (LD), a light emitting point of the laser light source 21 is about 3 μm in diameter, and a distance-measuring light with a small diameter is projected.

The distance-measuring light is projected to the object to be measured by the projecting optical system 16. The distance-measuring light reflected by the object to be measured passes through the projection optical axis 27 and enters the dichroic prism 47. Then, the reflected distance-measuring light is reflected by the dichroic prism 47 and enters the photodetection fiber 54. After being guided to the fifth collimator lens 55 by the photodetection fiber 54, the reflected distance-measuring light is turned to parallel luminous fluxes by the fifth collimator lens 55, and disturbance light is cut off by the interference filter 56.

FIG. 2 shows transmission characteristics of the interference filter 56. In the figure, the symbol B denotes photodetection characteristics of the photodetection element 58, C denotes the distance-measuring light, and D represents transmission characteristics of the interference filter 56. The transmission characteristics of the interference filter 56 is designed to have such transmission characteristics that only the light components in the wavelength range near the wavelength of the distance-measuring light C are allowed to pass. Specifically, the reflected distance-measuring light enters the photodetection element 58 in such condition that almost all of the disturbance light components are cut off. Through the switching between the distance-measuring light and the internal reference light by the chopper means 48, the internal reference light enters the photodetection element 58, and the distance is measured.

Figure 3:
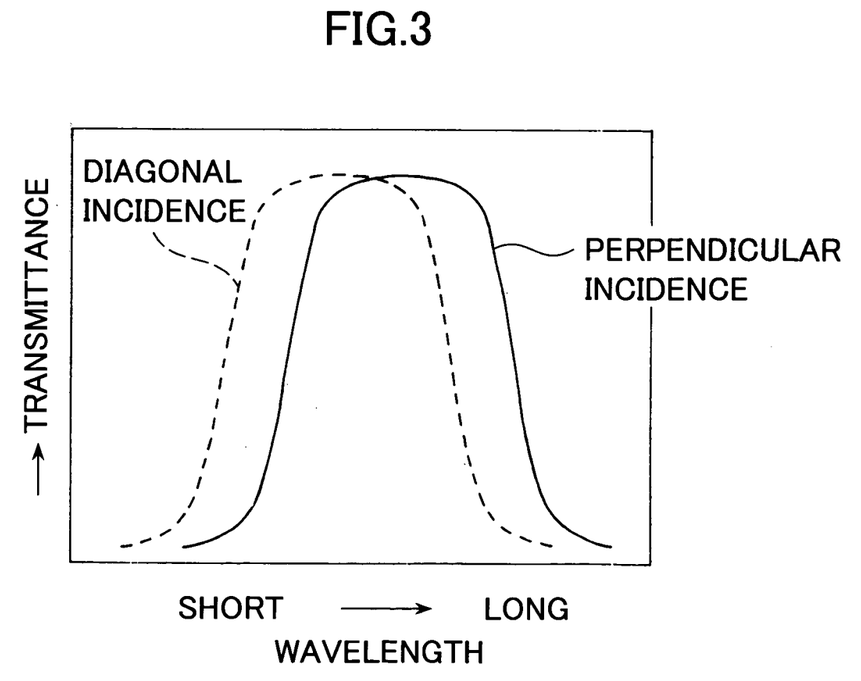
FIG. 3 is a diagram showing conditions and transmission characteristics of incident light beam entering the interference filter.

FIG. 3 shows other transmission characteristics of the interference filter 56. FIG. 3 shows a case where an incident light beam enters perpendicularly to the interference filter 56 (shown by a solid line) and a case where the incident light beam enters diagonally to the interference filter 56 (shown by a broken line). From the figure, it is evident that the wavelength ranges are deviated between perpendicular incidence and diagonal incidence. The interference filter 56 has such characteristics that only the light components near the wavelength range of the reflected distance-measuring light are allowed to pass. When the light enters the interference filter 56 diagonally, a light amount of the reflected distance-measuring light passing through the interference filter 56 is extensively decreased. The fifth collimator lens 55 turns the reflected distance-measuring light projected from the photodetection fiber 54 to parallel luminous fluxes. The reflected distance-measuring light entering the interference filter 56 is turned to the state of perpendicular incidence, and this prevents the decrease of the light amount of the reflected distance-measuring light by the interference filter 56.

The light amount adjusting motor 42 rotates the light amount adjusting plate 43 according to distance measurement. The intensity of the distance-measuring light projected from the light amount adjusting plate 43 is adjusted, and the intensity of the reflected distance-measuring light received by the photodetection element 58 is maintained at a constant level regardless of the distance to the object to be measured. The chopper means 48 switches whether the distance-measuring light is projected to the object to be measured or the distance-measuring light is projected to the photodetection optical system 18 as an internal reference light. The density filter 46 adjusts light intensity of the internal reference light so that light intensity of the internal reference light is approximately equal to light intensity of the reflected distance-measuring light.

The photodetection element 58 transmits photodetection signals of the reflected distance-measuring light and the internal reference light to the arithmetic unit 65, and the arithmetic unit 65 calculates a distance to the object to be measured according to the photodetection signal from the photodetection element 58. As described above, disturbance light except those light components in the wavelength range of the reflected distance-measuring light is removed by the interference filter 56, and the reflected distance-measuring light received by the photodetection element 58 has high S/N ratio and this makes it possible to measure the distance with high accuracy.

Here, description will be given on the S/N ratio of the reflected distance-measuring light received by the photodetection element 58. An avalanche photodiode (APD) is used as the photodetection element 58.

It is known that shot noise In in an APD is given by the following equation:

$$In = \sqrt{(2 \cdot q \cdot IL \cdot M^2 \cdot F \cdot B)}$$

where
q: Electronic charge
IL: Photocurrent when M=1
M: Multiplication factor
F: Factor
B: Bandwidth Here, q, M, F and B each represents a constant at the time of circuit designing and of an element. Therefore, the term changed due to the disturbance light is IL. When a case where the interference filter 56 is used is compared with a case where the filter shown in FIG. 8 is used, it is anticipated that disturbance light is decreased to about ¼. In this case, the shot noise In' is given as:

$$In' = \sqrt{(2q \cdot IL \times (1/4) \cdot M^2 \cdot F \cdot B)}$$

$$In'/In = \sqrt{(1/4)} = 0.5$$

By using the interference filter 56, the shot noise can be decreased to 0.5, and the S/N ratio can be improved as 2.0 times (1/0.5=2.0). Thus, the measurement accuracy can be maintained at high level.

Due to the construction of the projecting optical system such as the second optical path deflecting member 38 is arranged on the projection optical axis 27, the reflected distance-measuring light which is guided to the photodetection optical system 18 is luminous fluxes which lacks its central portion. For this reason, when the object to be measured is at near distance, the portion of the reflected distance-measuring light lacking the luminous fluxes concurs with an incident end surface of the photodetection fiber 54, and the reflected distance-measuring light may not enter the photodetection optical system 18. The doughnut lens 53 is used to refract the luminous fluxes in the perimeter of the reflected distance-measuring light, and the doughnut lens 53 enters the fluxes to the photodetection fiber 54. As a result, the reflected distance-measuring light is guided to the photodetection optical system 18 regardless of whether the distance to be measured is long or short.

In the prism measurement, a light beam with a larger spreading angle is projected in order to decrease the error caused by deviation of a visual axis of telescope from the distance-measurement optical axis.

When the prism measurement is selected, the rhombic prism 28 is positioned to a state deviated from the second optical path 26 and the projection optical axis 27. The distance-measuring light emitted from the laser light source 21 is mixed by the mixing means 23. By the mixing, the light amount speckles are eliminated, and measurement accuracy is improved.

The distance-measuring light is converged and entered to an incident end surface of the optical fiber 31 via the second collimator lens 29. The exit end surface of the optical fiber 31 is positioned on the projection optical axis 27. After being converged via the third collimator lens 32, the distance-measuring light passes through the beam splitter 35 and is projected to the object to be measured by the projecting optical system 16.

As described above, the beam diameter and the spreading angle of the projected distance-measuring light depend upon the size of the light emitting source. In the prism measurement, the exit end surface of the optical fiber 31 serves as a secondary light source. The end surface of the optical fiber 31 is 300 μm in diameter, and this is larger than the diameter of 3 μm of the semiconductor laser (LD) in the non-prism measurement as described above. Thus, the distance-measuring light with larger spreading angle is projected.

In the prism measurement, the conditions for distance measurement with high precision are such that the distance-measuring light has a larger spreading angle and is uniform. The projected distance-measuring light is mixed by the mixing means 23 and is turned to multi-mode by multiple reflections after passing through the optical fiber 31. As a result, speckles caused by coherence of the laser beam are prevented, and this suppresses the occurrence of light amount speckles.

In the distance measurement by the prism measurement, the S/N ratio is improved due to cut-off of the disturbance light by the interference filter 56. The reflected distance-measuring light entering the interference filter 56 is turned to the state of perpendicular incidence by the fifth collimator lens 55, and this prevents the decrease of the light amount caused by the interference filter 56. This is the same as in the case of the non-prism measurement.

Figure 4:
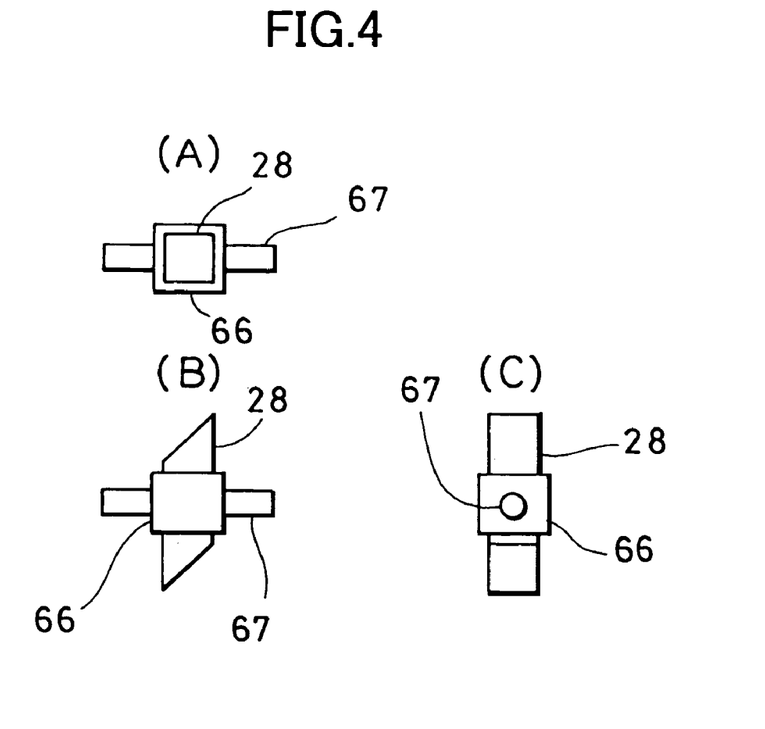
FIG. 4 is a drawing to explain an essential portion of an optical path switching means to be used in the first embodiment.

Referring to FIG. 4, description will be given now on the optical path switching means 24.

The rhombic prism 28 is held by the prism holder 66. A rotation shaft 67 is protruded from the prism holder 66, and the rhombic prism 28 is rotatably supported via the rotation shaft 67. A motor (not shown) and an actuator such as a solenoid (not shown) are connected to the rotation shaft 67. By the actuator, the rhombic prism 28 is rotated at a predetermined angle so that it can be placed on or separated from the second optical path 26 and the projection optical axis 27.

Figure 5:
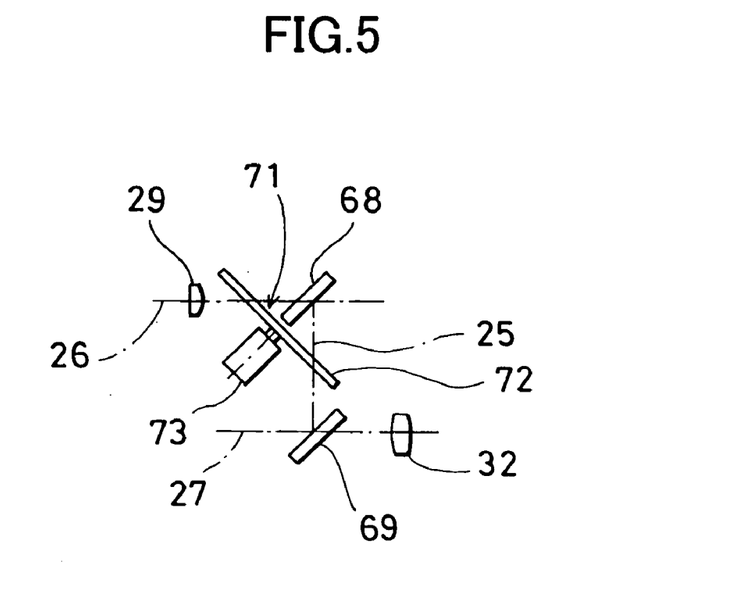
FIG. 5 is a schematical drawing to explain another type of an optical path switching means.

FIG. 5 shows another type of the optical path switching means 24.

In FIG. 5, the same component as shown in FIG. 1 is referred by the same symbol.

A first half-mirror 68 is arranged as a beam splitter on the second optical path 26, and a second half-mirror 69 is arranged as a beam splitter on the projection optical axis 27. The first half-mirror 68 and the second half-mirror 69 are arranged in parallel at opposed positions and are mechanically fixed on the housing of the distance-measuring device. By setting the second optical path 26 in parallel to the projection optical axis 27, the first optical path 25 is formed between the first half-mirror 68 and the second half-mirror 69. The distance-measuring light is reflected by the first half-mirror 68 and is reflected by the second half-mirror 69 after passing through the first optical path 25. Then, the distance-measuring light passes along the projection optical axis 27 and is projected from the projection optical system 16. A light beam switching unit 71 is provided so as to be spanned between the second optical path 26 and the first optical path 25. The light beam switching unit 71 comprises a light beam switching plate 72 with a transmission hole (not shown) and a motor 73 for rotating the light beam switching plate 72. When the second optical path 26 is opened, the light beam switching plate 72 shuts off the first optical path 25. When the first optical path 25 is opened, the second optical path 26 is shut off.

The light beam switching unit 71 is designed in such manner that the distance-measuring light is guided to the optical fiber 31 after passing through the first half-mirror 68, and the distance-measuring light reflected by the first half-mirror 68 is guided to the projecting optical system 16 via the second half-mirror 69.

Figure 6:
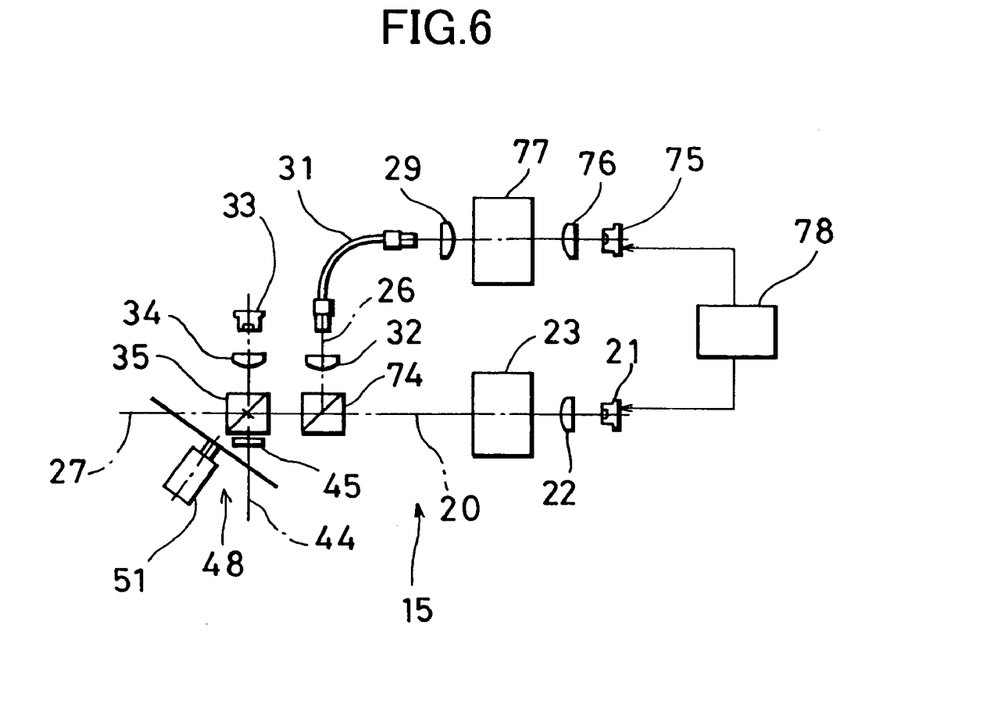
FIG. 6 is a schematical block diagram of a light source unit of a second embodiment of the present invention.

FIG. 6 shows a second embodiment of the present invention.

The second embodiment shows a case where a light source for prism measurement and a light source for non-prism measurement are separately installed. FIG. 6 shows a light source unit 15. The other features are the same as shown in FIG. 1, and details are not shown in the figure.

On the optical axis 20, there are provided a laser light source 21 used as a light source for non-prism measurement, a first collimator lens 22, a mixing means 23, and a beam splitter 74. On a second optical path 26 perpendicularly crossing the optical axis 20 at the beam splitter 74, there are provided a secondary laser light source 75, a secondary first collimator lens 76, a secondary mixing means 77, a second collimator lens 29, an optical fiber 31, and a third collimator lens 32. It is designed in such manner that a secondary distance-measuring light emitted from the secondary laser light source 75 enters the beam splitter 74. As the secondary laser light source 75, an LD with the same specification as the laser light source 21 is used.

Light emission and turning on and turning-off of the laser light source 21 and the secondary laser light source 75 are controlled by a light source control unit 78.

When the non-prism measurement is performed, the laser light source 21 is turned on, and the secondary laser light source 75 is turned off. A distance-measuring light from the laser light source 21 is converged by the first collimator lens 22 and is mixed by the mixing means 23. Then, the distance-measuring light passes through the beam splitter 74 and is projected via the projection optical axis 27. Or, the optical path is switched over by the chopper means 48, and the light is guided toward a photodetection optical system 18 (FIG. 1) (not shown) via an internal reference optical axis 44. As described above, a diameter of the light emitting point of the laser light source 21 is small, and a distance-measuring light suitable for the non-prism measurement can be obtained.

When the prism measurement is performed, the secondary laser light source 75 is turned on, and the laser light source 21 is turned off. A secondary distance-measuring light is converged by the secondary first collimator lens 76 and is mixed by the secondary mixing means 77. Then, the secondary distance-measuring light is converged to an incident end surface of the optical fiber 31 via the second collimator lens 29. After passing through the optical fiber 31, the secondary distance-measuring light is turned to parallel luminous fluxes by the third collimator lens 32 and is reflected by the beam splitter 74. Then, the secondary distance-measuring light is projected via the projection optical axis 27. Or, the optical path is switched over by the chopper means 48 and is guided toward the photodetection optical system 18 (FIG. 1) (not shown) via the internal reference optical axis 44.

In the prism measurement, the exit end of the optical fiber 31 serves as a secondary light source. The exit end of the optical fiber 31 has a diameter of 300 μm, and a secondary distance-measuring light with a large spreading angle suitable for the prism measurement can be obtained. Because the secondary distance-measuring light is turned to multimode by the optical fiber 31, the secondary distance-measuring light is uniformly projected without light amount speckles.

Regarding reflectivity and transmissivity of the beam splitter 74, transmissivity of the distance-measuring light may be set to higher values and reflectivity of the secondary distance-measuring light may be set to lower values, because the light amount lower than the non-prism measurement may be sufficient in the prism measurement.

In the second embodiment, the secondary laser light source 75 and the laser light source 21 are switched over by the light source control unit 78, and the optical path switching means 24 shown in the first embodiment may not be used. There is individual difference between the laser light source 21 and the secondary laser light source 75 in the process of manufacture, and it is not possible to emit a distance-measuring light with completely the same wavelength. However, error is as low as the one included in transmission wavelength range of the interference filter 56 (FIG. 1). There is practically no problem. A distance-measuring light with substantially the same wavelength can be emitted. High S/N ratio can be attained as in the first embodiment, and measurement accuracy can be maintained at high level.

In the second embodiment, the mixing means 23 may not be used.

The present invention provides a distance measuring device, which comprises a light source unit for emitting a distance-measuring light, a photodetection optical system, a projecting optical system for projecting the distance-measuring light from the light source unit to an object to be measured and for guiding the distance-measuring light reflected by the object to be measured to the photodetection optical system, and an internal reference optical system for guiding the distance-measuring light from the light source unit toward the photodetection optical system, wherein the light source unit can emit two distance-measuring lights having different spreading angles and having the same or almost the same wavelengths, and the photodetection optical system has an optical filter which transmits light components of narrower wavelength range of the distance-measuring light. As a result, disturbance light is extensively cut off. The S/N ratio to the distance-measuring light can be improved, and measurement accuracy is increased.

What is claimed is:

1. A distance-measuring device, comprising a light source unit, one projecting optical system having a projecting light optical axis and for projecting the distance-measuring light from said light source unit to an object to be measured, a photodetection optical system having a photodetection optical axis and for receiving a distance-measuring light reflected from said object to be measured, and an internal reference optical system for guiding the distance-measuring light from said light source unit toward said photodetection optical system as an internal reference light, wherein said light source unit comprises one light source for emitting said distance-measuring light, a first optical path for projecting said distance-measuring light from said light source with a first spreading angle toward said object to be measured, a second optical path for projecting said distance-measuring light from said light source with a second spreading angle toward said object to be measured, said first spreading angle being larger than said second spreading angle, an optical fiber arranged on one of said first and second optical paths, and an optical path switching means for guiding said distance-measuring light selectively toward one of said first and second optical paths, and wherein said photodetection optical system has an optical filter which transmits light in a narrow wavelength range that includes the wavelength of said distance-measuring light.

2. A distance-measuring device according to claim 1, wherein said optical fiber is arranged on said first optical path.

3. A distance-measuring device according to claim 1, wherein said distance-measuring light is infrared light.

4. A distance-measuring device according to claim 1, wherein said optical filter is arranged on an optical path common to the internal reference light and to the reflected distance-measuring light.

5. A distance-measuring device according to claim 1, wherein said photodetection optical system comprises an optical member for turning luminous fluxes entering said optical filter to parallel beams.

6. A distance-measuring device according to claim 1, wherein said optical path switching means is provided so as to be spanned between said first optical path and said second optical path and is a deflecting optical member for deflecting the optical path, and said deflecting optical member is placed on or separated from said first optical path and said second optical path.

7. A distance-measuring device according to claim 1, wherein there is provided a pointer light source for emitting a visible laser beam along a projection optical axis.

* * * * *